United States Patent [19]

Ishibashi et al.

[11] Patent Number: 5,379,307
[45] Date of Patent: Jan. 3, 1995

[54] SYSTEM FOR DETECTING FAILURE IN DUAL BUS USER NETWORK

[75] Inventors: Ryoichi Ishibashi; Tetsuo Tachibana; Hisakazu Ohmori, all of Kawasaki, Japan

[73] Assignee: Fujitsu Limited, Kawasaki, Japan

[21] Appl. No.: 909,035

[22] Filed: Jul. 6, 1992

[30] Foreign Application Priority Data

Jul. 5, 1991 [JP] Japan .................. 3-165365

[51] Int. Cl.$^6$ ............................. H04J 3/12
[52] U.S. Cl. ..................... 371/62; 371/16.3; 371/20.1
[58] Field of Search ............. 371/62, 16.3, 20.1; 370/60, 85.9, 94.1

[56] References Cited

U.S. PATENT DOCUMENTS

| | | | |
|---|---|---|---|
| 4,922,244 | 5/1990 | Hullett et al. | 340/825.5 |
| 5,050,166 | 9/1991 | Cantoni et al. | 370/94.1 |
| 5,051,742 | 9/1991 | Hullett et al. | 340/825.5 |

FOREIGN PATENT DOCUMENTS 0196911 10/1986 European Pat. Off. .
86/03639 6/1986 WIPO .

OTHER PUBLICATIONS

Fujiyama et al., "ATM Switching System Evolution and Implementation for B-ISDN," *ICC* '90, vol. 4, Apr. 1990, Atlanta, Ga., pp. 1577-1583.

Stock et al., "A Discrete Time Analysis of the DQDB Access Protocol with General Input Traffic," *ITS* '90, Sep. 1990, Rio de Janeiro, BR, pp. 121-126.

*Primary Examiner*—Vincent P. Canney
*Attorney, Agent, or Firm*—Staas & Halsey

[57] ABSTRACT

System for controlling access competition among a plurality of terminals under the DQDB protocol in a B-ISDN where the terminals are electrically connected to a dual bus with a downbus and an upbus extending from a network terminal. Each of the terminals has data transmission processor, downbus processor, upbus processor, a timer and failure detector. When data transmission request is issued from the data transmission processor, the failure detector is activated in response to a request to start the timer so as to count a given time interval which has elapsed. If either a request message or data cannot be sent even when the timer reaches a predetermined value, the failure detects signals that a failure has occurred in the dual bus.

5 Claims, 10 Drawing Sheets

SYSTEM FOR DETECTING FAILURE IN DUAL BUS USER NETWORK

BACKGROUND OF THE INVENTION (1) Field of the Invention

The present invention relates to a failure detecting system for a communication system, and more particularly, to a failure detecting system for a user network connected to broad band ISDN in which data is transferred by using ATM cells, and which is connected to a customer station through a network terminator and a bus conformable to a DQDB protocol.

(2) Description of the Related Art

Broad-band ISDN (Integrated Services Digital Network) has been developed to allow practical broadband communication such as video communication. The broad-band ISDN is currently realized by using an ATM (Asynchronous Transfer Mode). In the ATM, data is transferred by dividing it into fixed-length short packets called cells. The cells are exchanged and transferred by an ATM exchange or a node.

In the ATM, a circuit or, in other words, a line between a sender and a receiver, is not always provided, but a virtual circuit or virtual line is provided through which an essential ATM cell is transmitted. This allows a plurality of virtual circuits to share a single transmission line. To handle this line multiplication, a multiplication method called a statistical multiplication is employed to manage the statistical multiplication in such a way that the total data multiplied on a single transmission line does not exceed the capacity of the transmission line. Statistical multiplication ensures the efficient use of available circuits. Techniques have been developed to treat congestion when it occurs. For subscribers connected to a broad-band ISDN, a plurality of data receiving/transmitting devices called terminal equipments or terminal adapters in a customer station are connected through a bus. A DQDB (Distributed Queue Dual Bus) is considered to be favorable for such a bus (a user network). The present invention relates to a failure detecting system in an ISDN in which the communication between a local switch and each of the terminal equipments or terminal adapters is carried out in accordance with the DQDB protocol.

In the broad-band ISDN communication employing the DQDB protocol in the user network side, congestion may occur in an apparatus on the network side. Such congestion may occur in an ATM exchange, a local switch, or any processing device for processing ATM cells. To relieve this congestion on the network side, it can be considered to restrict the ability of a subscriber to transmit an ATM cell to the apparatus, in which the congestion has occurred.

In a conventional congestion relieving system, a network terminator inserts busy bits equal to "1" into busy bit areas of cells in accordance with a required rate of restriction of cells to be transmitted. This conventional system is disclosed in U.S. Pat. No. 5,231,630 and U.S. Ser. No. 831,794, filed on Feb. 5, 1992, both the U.S. Patent and the presently-pending U.S. patent application are commonly assigned with the present application. The cells having the busy bits equal to "1" are deemed as those being used by the terminal equipments or the terminal adapters. Therefore, no terminal equipment or terminal adapters insert data into cells with the busy bits set to "1". Accordingly, the cells with the busy bits="1" inserted at the network terminator have no set destination so that, when these cells are received by an apparatus such as an ATM exchange, they are deemed invalid and discarded. As a result, the number of cells to be transmitted to an apparatus, such as an ATM exchange, is decreased and the congestion is relieved. In a conventional system described above, however, a failure in transmission of each cell to a bus has not been considered.

SUMMARY OF THE INVENTION

It is an object of the present invention to provide a system capable of rapidly detecting any failure developed in the control of a DQDB system.

According to the present invention, a plurality of terminals are electrically connected to a dual bus composed of a downbus and an upbus extending from a network terminal. Each terminal is provided with a data transmission processor, downbus processor, a timer and a failure detector.

When a data transmission request is issued from the data transmission processor, the failure detector is activated to start the timer. A failure in each bus can be detected when either a request message or data is not transmitted after a given time interval has elapsed.

It is then determined, based on information output from the downbus processor, whether the request message has been transmitted during the given time interval. Further, it can be determined, based on information output from the upbus processor, whether actual data has been transmitted during the given time interval.

That is, when a cell having a request bit with a request message (i.e., "1") written therein is not transmitted from the downbus processor, it can be deduced that a failure has occurred in the downbus.

Figure 1:
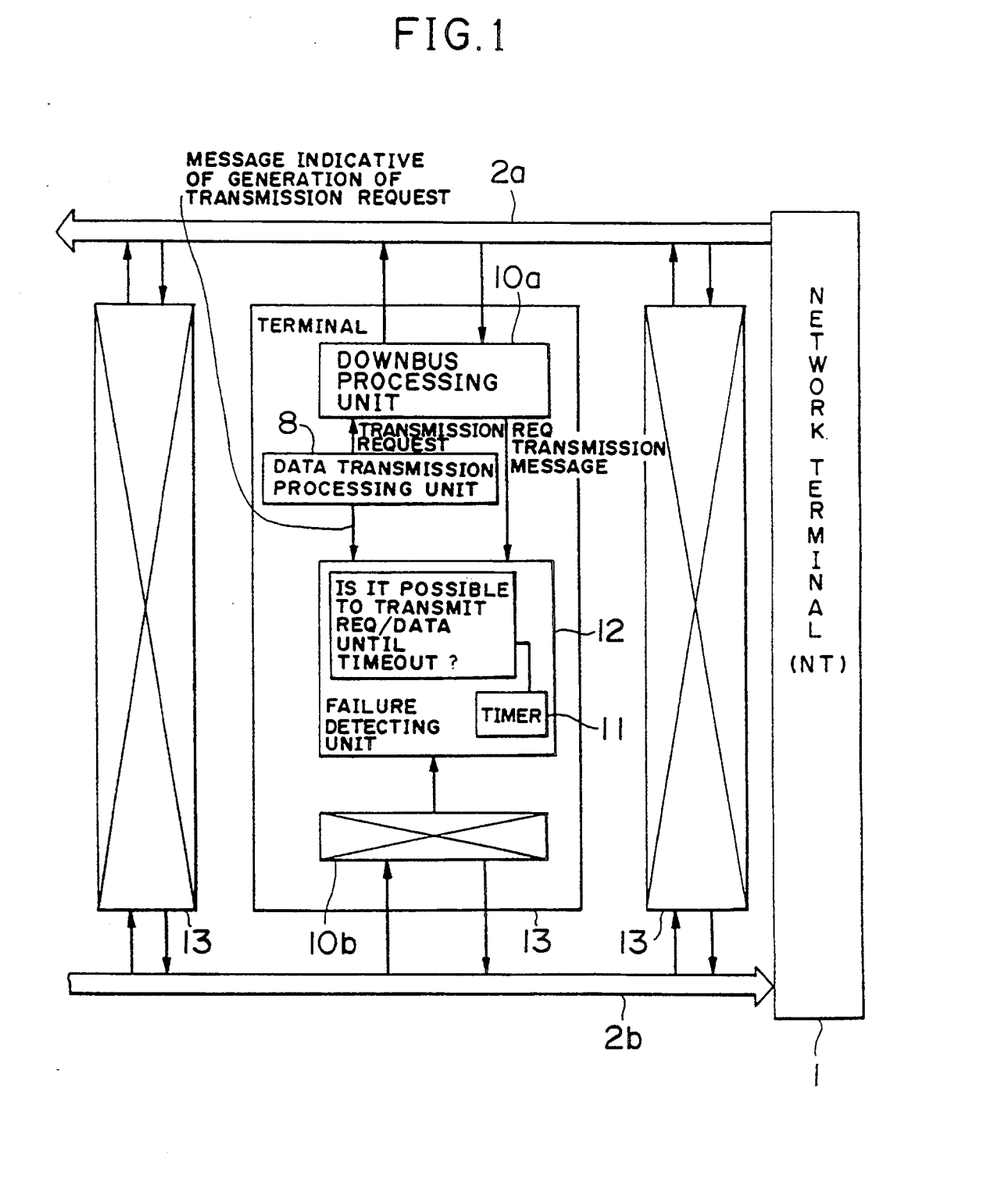
FIG. 1 is a block diagram of the present invention.

On the other hand, when the actual data is not transmitted during the given time interval, in spite of the fact that the request message has been sent, it can be deduced that a failure has occurred in either the downbus or the upbus which extends in the downstream direction (i.e., in the left-side direction as seen in FIG. 1).

According to the present invention, as has been described, any failure in the transmission of the data to the bus, which is developed under the bus control of the DQDB system, can rapidly be detected, thereby making it possible to rapidly deal with such failure.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 7:
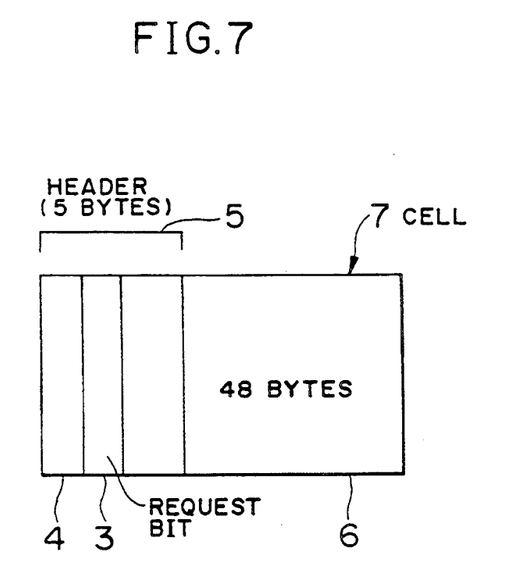
FIG. 7 is a diagram describing the format of each cell employed in an ATM.
Figure 8:
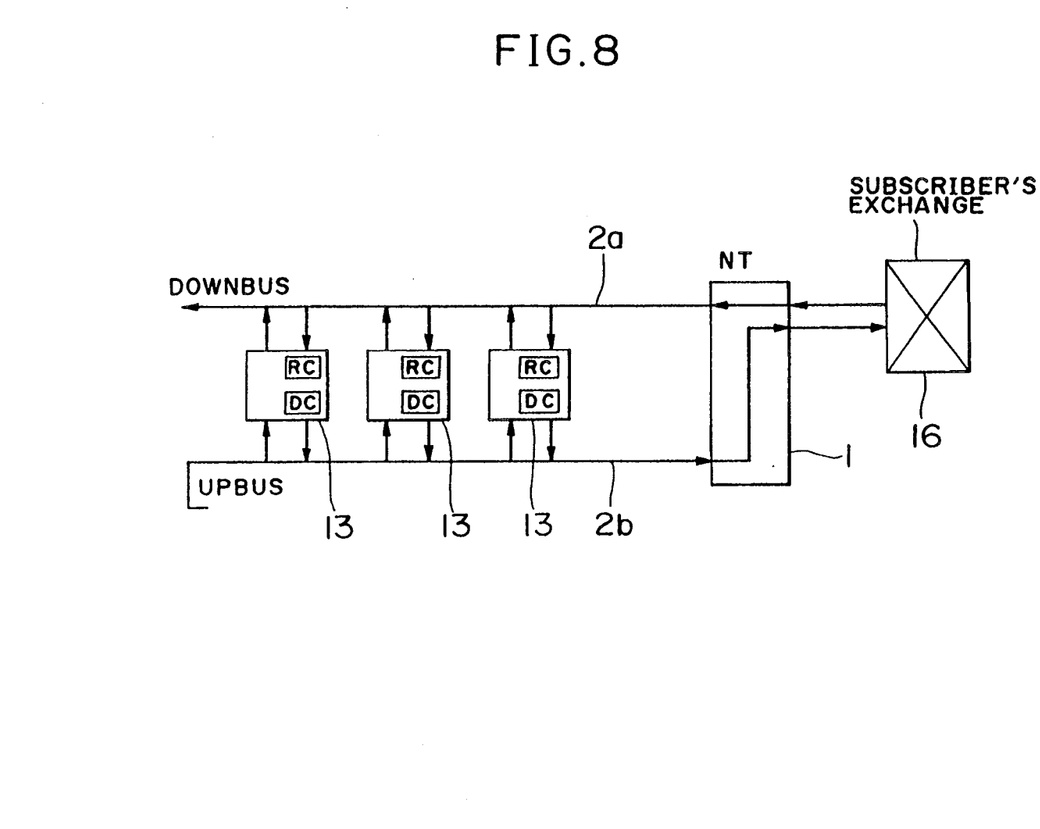
FIG. 8 is a diagram describing a subscriber station or system in a B-ISDN.

With reference to FIGS. 7 and 8, the DQDB ATM protocols will be described hereinafter in detail. FIG. 7 is a diagram describing a format of a cell 7 under the ATM. FIG. 8 is a diagram describing a subscriber station or system in the B-ISDN.

In a system on a subscriber side, there is used an arrangement in which a plurality of terminals 13 (TE) electrically connected to network terminal means (NT) by buses. A DQDB (Distributed Queue Dual Bus) has been effective as a system for controlling access competition among the terminals 13 connected to the network terminal by the buses.

A cell 7 in the ATM comprises a header 5 having a capacity of 5 bytes and an information field 6 having the capacity equivalent to 48 bytes.

The header 5 includes a one bit long busy bit 4 and a one bit long request bit 3.

The busy bit 4 is used to determine whether effective data has been stored in the information field 6 of the cell 7. When the data has been written into the information field 6, "1" is entered or registered in the busy bit 4.

The request bit 3 is used to determine as to whether a request for writing data into the cell 7 has been made. When the data writing request is received from the terminal 13, "1" is entered in the request bit 3.

That is, when a data transmission request is issued from a certain terminal 13, a cell 7 having a request bit 3 set to "0" is firstly accessed from the downbus 2a. Then, the cell 7 having the request bit 3 set to "1" is returned to the downbus 2a again. Further, the terminal 13 waits for a cell 7 having a busy bit 4 set to "0", which appears on the upbus 2b, and performs a process for storing data in the cell 7 and transferring the cell 7 to the upbus 2b.

It is obvious that access competition by the request takes place among a plurality of terminals 13 at this time. A procedure for controlling the access competition will be described below with reference to FIG. 8.

Subscriber stations or systems are known having structures in which a plurality of terminals such as general subscribers, a LAN or PBX, etc. are accommodated. FIG. 8 shows a subscriber system in which a given number of terminals (TE) are electrically connected in parallel to a network terminal (NT) 1 by buses 2a, 2b. When the terminals (TE) are not activated in the ATM, they are connected to the network terminal 1 by a terminal adaptor (TA). In the following description, each of the terminals (TE) and the terminal adaptor (TA) are called generically the terminal (TE) 13.

The terminal (TE) 13 is electrically connected to the downbus 2a and the upbus 2b of the network terminal (NT) 1. When the terminal (TE) 13 receives data, it provides access to a necessary cell over the downbus 2a. When data is transmitted from the terminal (TE) 13, necessary data is written into an information field 6 of an empty cell 7 while being passing through the upbus 2b by way of the downbus 2a.

Figure 9:
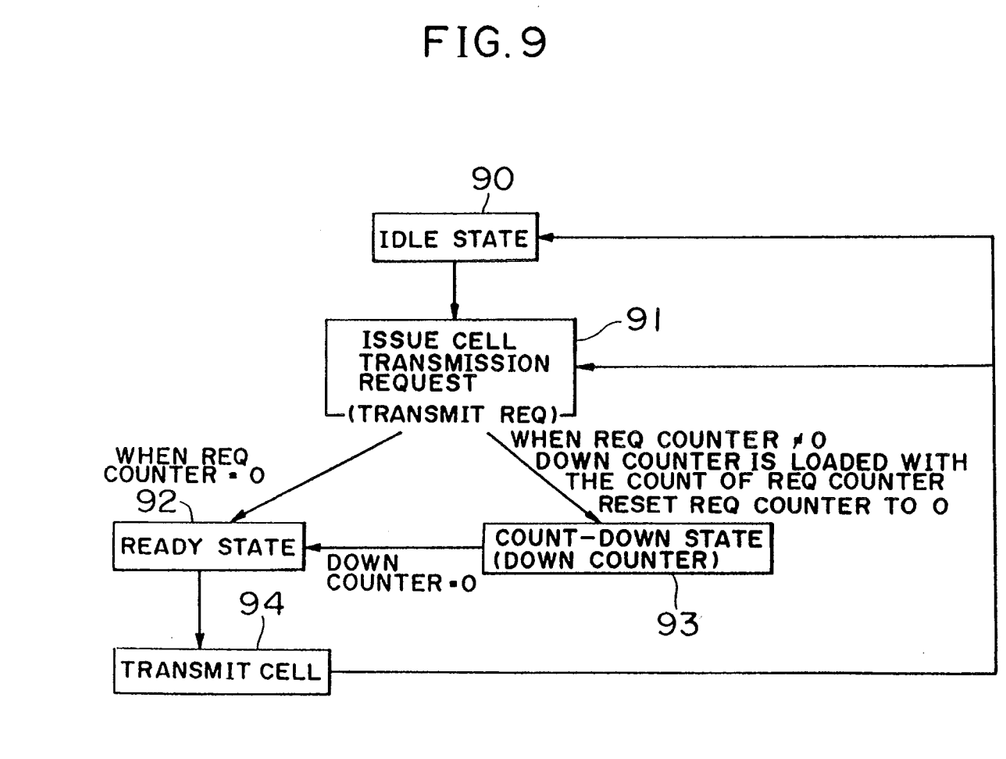
FIG. 9 is a diagram describing the status transition of a terminal (TE) used to describe a prior art.

Looking now at FIGS. 9 and 10, the following control is performed to adjust the access competition.

FIG. 9 is a diagram for describing status transition of a terminal (TE) 13. FIG. 10 is a diagram for describing operations of a request counter (RC) and a down counter (DC) which perform competitive control.

The request counter (RC) and the down counter (DC) are disposed in the terminal (TE) 13. The request counter (RC) is used to count the number of transmission requests of a terminal on the downstream side (network terminal means 1 side: the terminal 13 located on the side of the network terminal 1 will hereinafter be referred to as an "higher-order terminal") of the upbus 2b as viewed from the present terminal.

The down counter (DC) goes down to the present terminal's turn to allot or set up a cell 7 in advance with respect to a request taking the precedence over a request by the present terminal. The access competition is controlled by each of the two types of these counters.

When a data transmission request is issued in a state in which the terminal (TE) 13 is idle (Step 90 in FIG. 9), a request message is sent to the downbus 2a (see FIG. 8) (Step 91 in FIG. 9). The request message is entered or registered in the request bit 3 of the ATM cell, as shown in FIG. 7, as "1".

At this time if the count of the request counter (RC) is not "0", the down counter (DC) is loaded with the count of the request counter (RC) which is now reset to "0". As a result, the down counter is ready to count down, i.e., the routine procedure proceeds to a count-down state (Step 93 in FIG. 9).

However, if when the count of the request counter (RC) is "0" when a data transmission request is issued, the routine procedure proceeds to a Ready state (Step 92).

The count of the request counter (RC) represents the number of request messages generated from terminals 13 located on the higher-order side as viewed from the present terminal. Thus, when the count of the request counter (RC) reaches "0", no request is issued from the higher-order terminal, so that the routine procedure can immediately proceeds to the Ready state (Step 92 in FIG. 9).

After the request counter has gone down to zero, the down counter (DC) is decremented by 1 each time a cell having a busy bit 4 (see FIG. 7) set to "0" travels along or passes through the upbus 2b. When the count of the down counter (DC) reaches "0", the routine procedure proceeds to the Ready state (Step 92).

Thereafter, when a cell having a busy bit indicative of "0" appears on the upbus in the Ready state, data is entered in the information field 6 of the cell and such a cell is sent to the bus (Step 94).

Operations of the request counter and the down counter at the respective states will now be described with reference to FIG. 10.

Figure 10A:
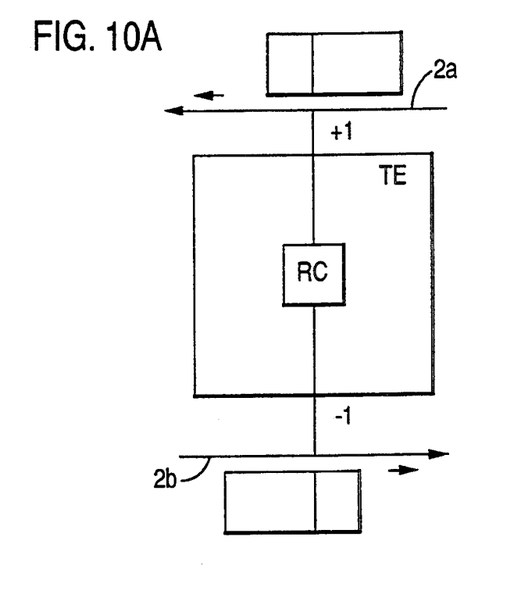
FIG. 10 consisting of A-C is a diagram describing the operations of a request counter (RC) and a down counter (DC) which perform competitive control simultaneously.

FIG. 10A shows the operation of the request counter (RC) from an idle state to request transmission. The request counter (RC) of the terminal (TE) 13 counts up, i.e., is incremented by 1, when a cell having a request bit 3 indicative of "1" passes through a the downbus 2a. In addition, the request counter (RC) counts down, i.e., is decremented by 1, when a cell having a busy bit 4 indicative of "0" passes through the upbus 2b. As a result, the request counter (RC) counts the number of request bits of a cell transmitted by a higher-order terminal (TE) 13 located on the upstream side of the present terminal (TE), and counts down the unused or free cells which can be transmitted by the higher-order terminal.

Figure 10B:
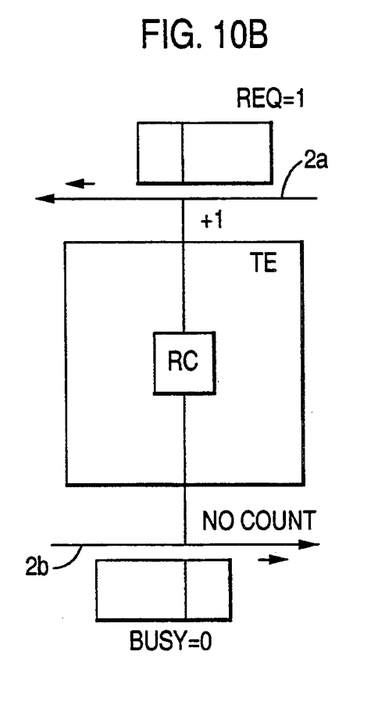

FIG. 10B shows the operation of another request counter (RC). Here, a cell having a request bit indicative of "1" is sent to the downbus 2a. Then, the down counter (DC) is loaded with the count of the request counter (RC) which is reset to zero. Thereafter, the routine procedure proceeds to the count-down state (Step 93 in FIG. 9), and the routine procedure proceeds to the Ready state when the count of the request counter (RC) reaches "0". The count operation of the request counter (RC) under this condition is carried out to confirm the number of a dispersed queue after a cell has been transmitted to a corresponding bus. Thus, the request counter (RC) is incremented by 1 under this condition when a cell having a request bit 3 set to "1" travels along or passes through the downbus 2a. However, the request counter (RC) does not count down if a cell having a busy bit 4 indicative of "0" passes therethrough. That is, the down counter (DC) shown in FIG. 10C counts the number of incoming cells which can be transmitted by the present terminal.

Figure 10C:
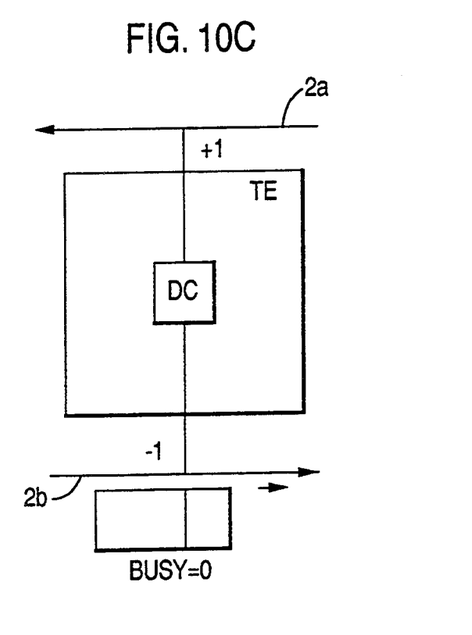

FIG. 10C shows the operation of the down counter (DC). A cell having a request bit indicative of a desired value is sent to a downbus 2a. Then, the down counter (DC) is loaded with the count of the request counter (RC), so that the down counter is brought into the count-down state (Step 93 in FIG. 9). When a cell having a busy bit 4 indicative of "0" travels along the upbus 2b, the down counter (DC) is decremented by 1. When the count of the down counter (DC) reaches "0", the cell is sent (Step 94 in FIG. 9).

Since a process for controlling the access competition by the requests among the terminals is carried out by using the request counter (RC) and the down counter (DC) as described above, the access competition control can be performed with a minimal time-delay.

It has, however been found out by the present inventor that the prior art has the following problem.

When a failure in transmission of each cell to a downbus 2a occurs in a higher-order terminal (i.e., a terminal as seen in a left to right arrangement from the present terminal in FIG. 8), for example, it is considered that each cell 7 having a request bit indicative of "1" is continuously sent to the downbus 2a.

A first embodiment of the present invention will hereinafter be described. The first embodiment is effective when a request message cannot be sent owing to a failure of a higher-order terminal.

Figure 2:
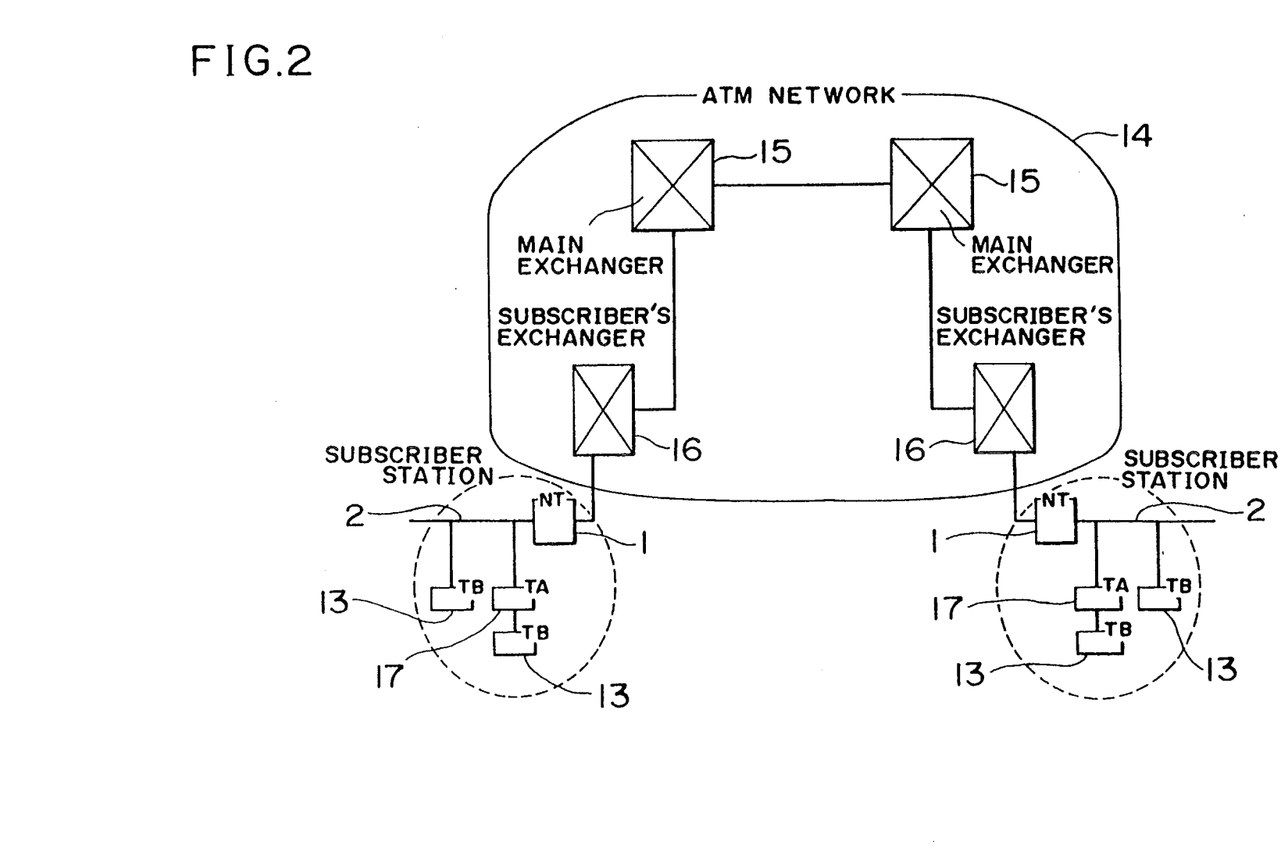
FIG. 2 is a diagram showing the structure of a system of the first and second embodiments of the present invention.

As shown in FIG. 2, an ATM network 14 employed in the present embodiment comprises interconnected main exchangers 15 and a plurality of subscribers' exchangers 16 connected in cascade to main exchangers 15.

Further, network terminals (NT) 1 are electrically connected in cascade to the respective corresponding subscribers' exchangers 16. A plurality of terminals (TE) 13 are electrically connected directly or via terminal adaptors (TA) 17 to corresponding buses (dual buses) 2 of the network terminals (NT)1. The term "subscriber stations" or "systems" refers to the network terminals (NT)1, the terminals (TE)13 and the terminal adaptors (TA) 17.

Figure 3:
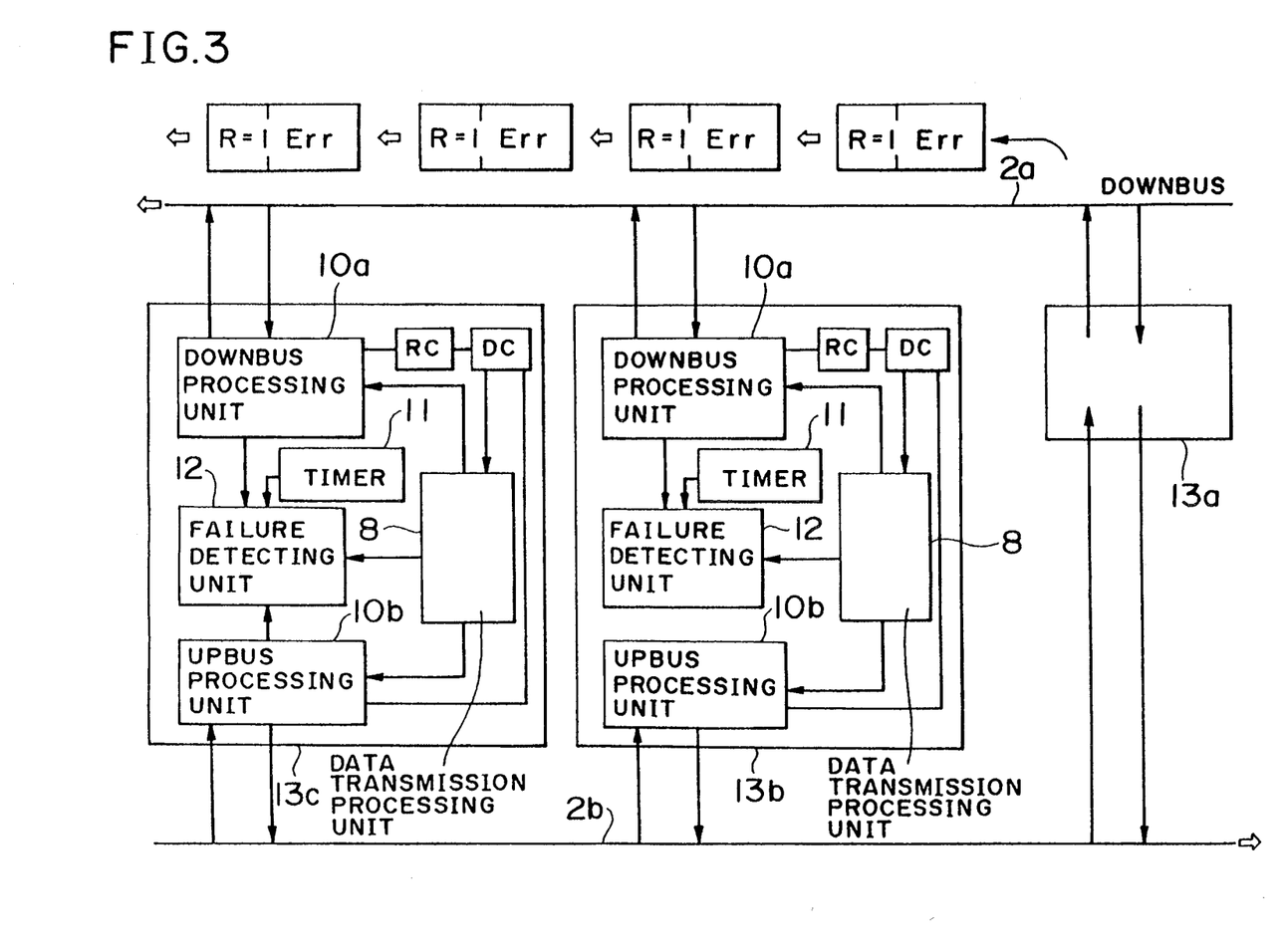
FIG. 3 is a block diagram of a subscriber's downbus system employed in a subscriber station according to the first embodiment of the present invention.

FIG. 3 shows the structure of a subscriber system according to the first embodiment.

Each of the terminals 13 has a data transmission processing unit 8, downbus processing unit 10a, failure detecting unit 12, a request counter (RC), and a down counter (DC).

The data transmission processing unit 8 has a function for transmitting data therefrom and a function for generating a data transmission request as a message, both information being sent to the downbus processing unit 10a and the failure detecting unit 12.

The downbus processing unit 10a takes in a cell 7, i.e., brings it from the downbus 2a, and performs a process for writing a request message into the request bit 3 in a header field 5 of the cell 7. The result obtained by the downbus processing unit 10a is sent to the failure detecting unit 12 as a request transmission message.

The failure detecting unit 12 is connected to a timer 11, which serves as a subtractive timer. The timer 11 is loaded with an initial value from either a ROM or RAM (not shown) in and operates response to a start instruction so as to start a subtractive process. i.e., count down.

Referring now to FIG. 3, a first terminal 13a, a second terminal 13b and a third terminal 13c are electrically connected to the downbus 2a and the upbus 2b. Let's now assume that, for example, the first terminal 13a is regarded as a higher-order terminal as viewed from the second terminal 13b, whereas the third terminal 13c is regarded as a lower-order terminal as seen from the second terminal 13b. Hereinafter, a description will be made principally of the second terminal 13b.

When a data transmission request is issued from the second terminal 13b, a cell having a respects to request bit with "0" entered therein is accessed, as has been described with the prior art, and the processes hereinbefore explained with reference to FIGS. 9 and 10 are executed to transmit the data at the final stage.

However, when an error occurs in the cell 7 in which a request bit indicative of "1" has continuously been entered therein in the first terminal 13a, the second terminal 13b cannot access a cell 7 having a request bit indicative of "0". Therefore, the second terminal 13b cannot proceed past Step 91 as shown in FIG. 9.

Thereafter, according to the present invention, the second terminal 13b executes the following processes.

When a data transmission request is first issued from the data transmission processing unit 8 of the second terminal 13b (Step 401 in FIG. 4), the timer 11 is activated (Step 402).

Figure 4:
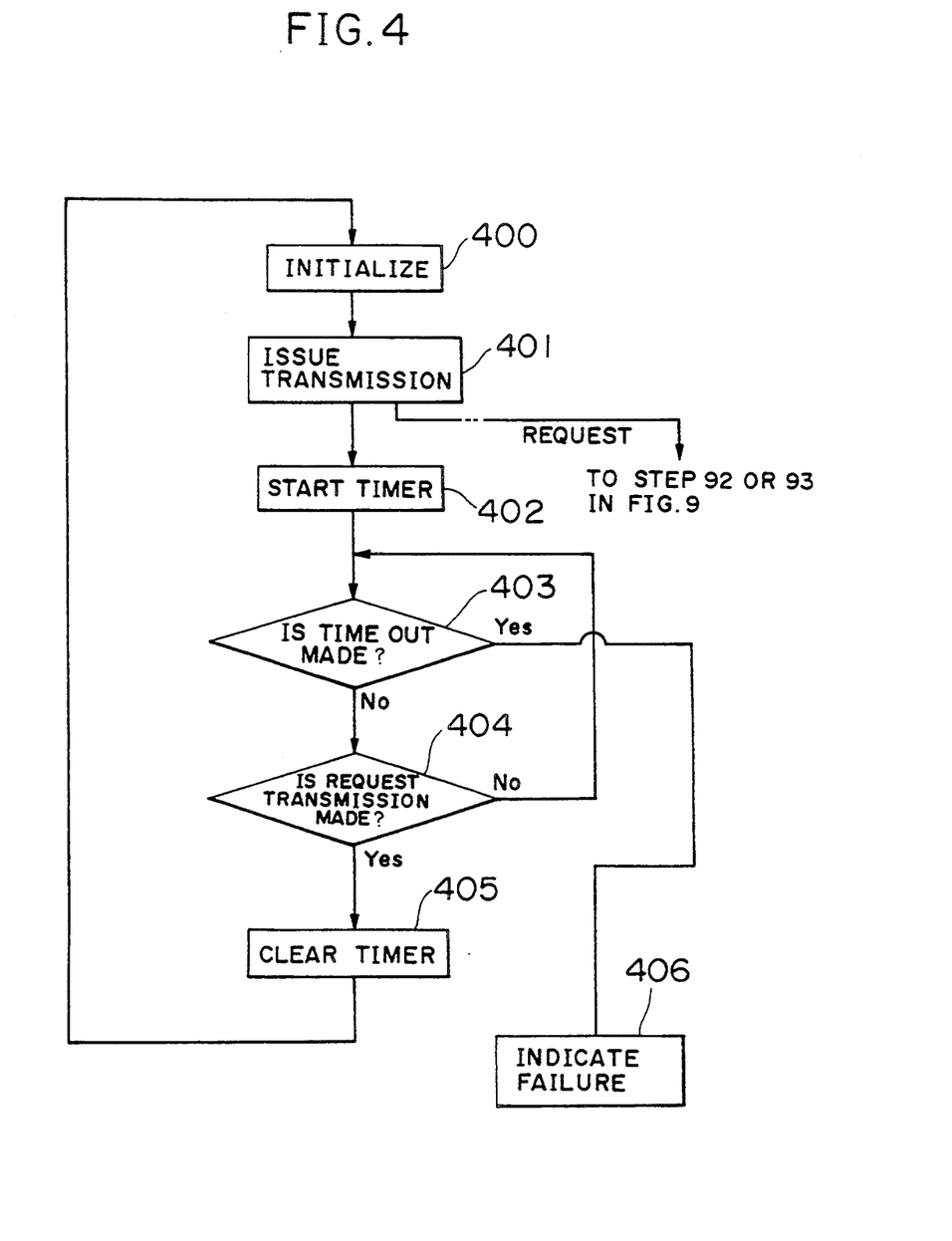
FIG. 4 is a flowchart of a processing sequence of the first embodiment of the present invention.

In addition, procedure 92 or 93 is executed concurrent with the start of the timer 11. That is, the timer 11 is started simultaneously with the procedure (subsequent to the routine procedure 92 or 93) for the data transmission. Thereafter, when data cannot be transmitted before the timer 11 takes time out, as will be described later, such a state is detected as a failure.

The timer 11 now counts down as described above. When the count of the timer 11 reaches "0", a time-out signal is generated.

The time-out period varies depending on a bus zone or band but may be a several mm secs when the data signalling rate ranges from 150 Mbps to 600 Mbps. When a plurality of terminals 13 are interconnected, the time-out period may be rendered longer for terminals 13 is lower-order places. That is, a higher priority is given to each of higher-order terminals upon the request transmission. This is because the time from the generation of a request to the actual transmission of data is longer for terminals 13 in the lower-order places.

During a period from the start of the timer 11 to the time-out, the failure detecting means 12 determines (in Step 404) whether or not a request message has been sent by the downbus processing means 10a, i.e., a cell 7 into which a request bit indicative of "1" and written, has been transmitted. If the answer is determined to be yes in Step 404, the timer 11 is cleared (Step 405) and placed in the initial state (Step 400).

When the time-out is reached in a state in which the delivery of the request has not been performed (Step 403), a warning buzzer produces a sound indicative of a failure in the data transmission or a warning lamp is lighted to indicate or display the failure (Step 406).

Accordingly, as described above, a failure in the transmission of the data to the bus connected to the higher-order terminal 13a, as seen from the present terminal 13b, can easily be detected by monitoring a given time interval from the time of the data transmission request.

Incidentally, the initially-set value of the timer 11 may be changed for each terminal 13 depending on the number of the higher-order terminals or the processing capacity of each terminal.

In the first embodiment, the terminal 13b determines, in Step 404 of FIG. 4, whether a request message has been sent. However, the procedure in Step 404 may be replaced by a procedure for determining whether or not actual data has completely been sent.

When the actual data cannot be transmitted after the given time interval has elapsed from the time of the data transmission request, such a process can provide an advantageous effects in that a failure can relatively easily be detected although it is difficult to specify a point at which the failure occurs.

A second embodiment of the invention is effective in an unwanted failure by which data cannot actually be transmitted in spite of the fact that a request message has been sent.

Figure 5:
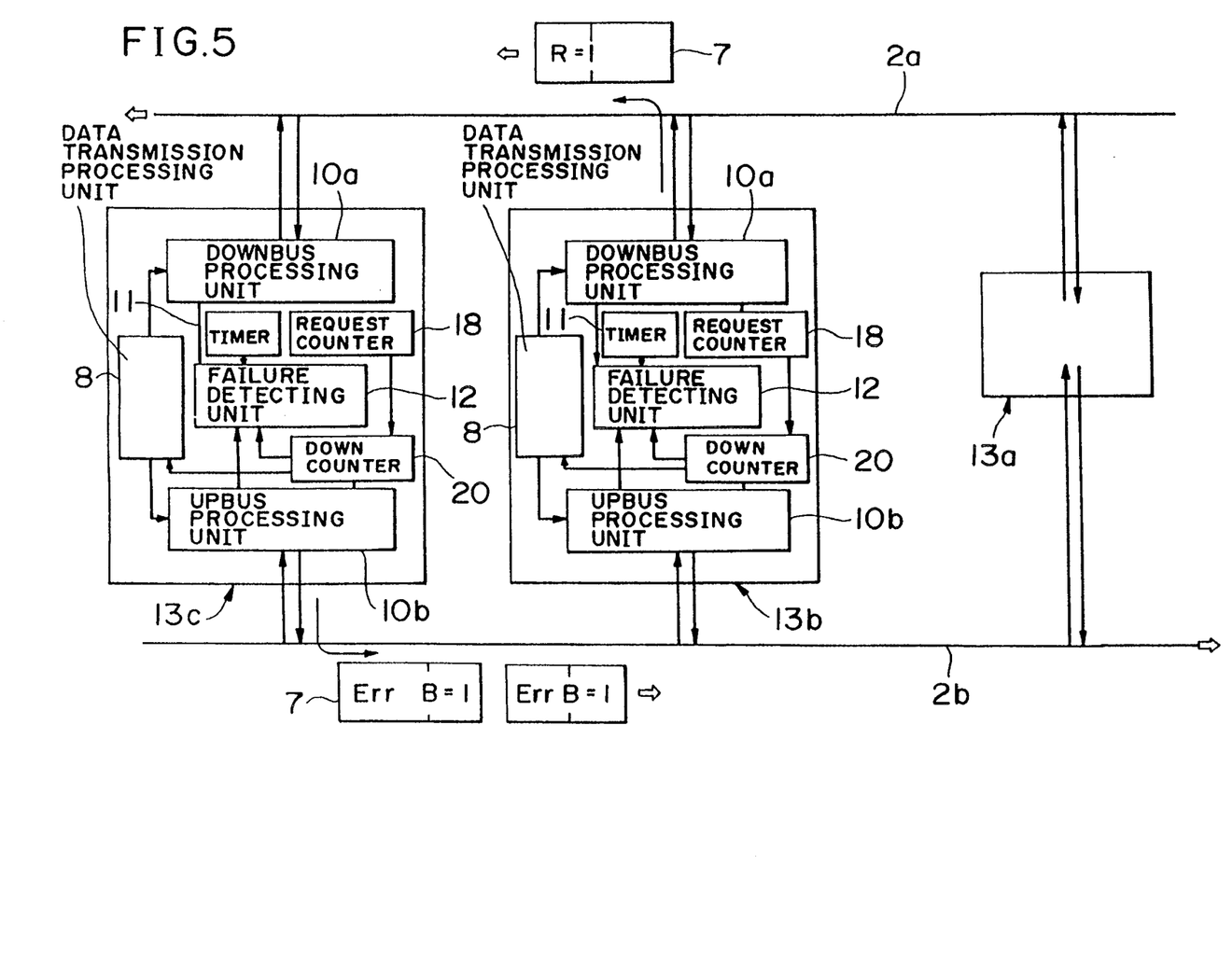
FIG. 5 is a block diagram illustrating a bus system employed in a subscriber station according to the second embodiment of the present invention.

FIG. 5 is a block diagram showing a bus system employed in a subscriber system or station according to the second embodiment.

Each of terminals 13 employed in the second embodiment basically comprises a downbus processing unit 10a, substantially as described in the first embodiment, a failure detecting unit 12, upbus an processing unit 10b, a request counter (RC) 18, and a down counter (DC) 20.

The failure detecting means 12 has a subtractive timer 11, similar to that described in the first embodiment, which is loaded with an initial value from either a ROM or a RAM (not shown). In response to a start instruction the timer 12 starts a subtractive process, i.e., count down.

Figure 6:
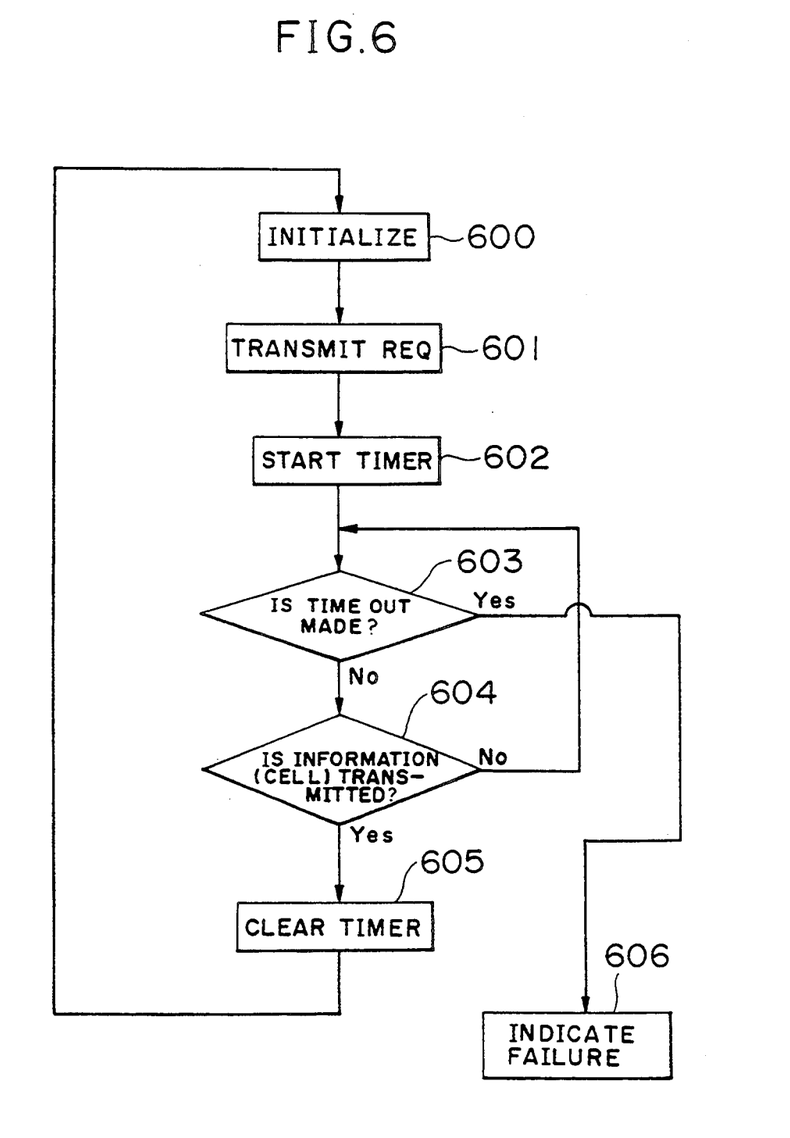
FIG. 6 is a flowchart describing the processing sequence of the second embodiment of the present invention.

A method or system according to the second embodiment for detecting a failure will now be described with reference to FIGS. 5 and 6.

When a data transmission request is issued from data transmission processing unit 8, the value of request counter (RC) 18 is loaded in the down counter (DC). The request counter (RC) 18 is responsive to the data transmission request so as to count the number of cells 7 which travel along or pass through a downbus 2a and having a request bit 3 (="1") into which a request message has been written as data. As a result, the number of the terminals 13 which are located on the higher-order side as seen from the present terminal (the second terminal 13b in the present embodiment) and have already issued data transmission requests, can be counted.

When the downbus processing unit 10a brings a cell 7 having a request bit 3 which is null (i.e., the request bit 3 having "0" entered therein) from the downbus 2a, the downbus processing unit 10a registers a request message into the request bit 3 (i.e., the request bit 3="1") of the cell 7 as data and reinserts the cell 7 into the downbus 2a.

When the upbus processing units 10b brings cells 7 from the upbus 2b, the down counter (DC) 20 counts the number of the cells 7 each having an empty busy bit 4. That is, each idle or empty cell 7, which passes through the second terminal 13b before the count of the down counter (DC) 20 reaches "0", is used for the data transmission of a higher-order terminal, as viewed from the second terminal 13b.

When the count of the down counter (DC) 20 has reached "0", the data used for the transmission request issued by the terminal is written into the information field 6 of the next vacant cell 7 so as to be sent to the upbus 2b.

When a failure occurs in a lower-order terminal, e.g., a third terminal 13c as seen from the second terminal 13b, such that such lower-order terminal continuously writes a "1" into each busy bit 4 of each passing cell 7, a cell having a busy bit indicative of "0" never reaches the upbus processing means 10b of the second terminal 13b. Therefore, the second terminal 13b cannot transmit desired data.

According to the second embodiment, when the failure detecting means 12 receives a request transmission message from the downbus processing means 10a (Step 601 in FIG. 6), the timer 11 is started (Step 602).

During the period from the start of the timer 11 to the predetermined time-out, the failure detecting means 12 determines (in Step 604) whether or not data has been transmitted by upbus processing means 10b. In other words, the down counter (DC) 20 determines (in Step 604) whether or not data has been written into the information field 6 of each cell 7 having the busy bit 4, 1="0" after having gone down to "0", and the cell 7 has been transmitted to the upbus 2b. If the answer is determined to be yes in Step 604, the timer 11 is cleared (Step 605), and placed in the initial state (Step 600).

When the time-out period has been reached and the delivery of the data to the upbus 2b has not been performed (Step 603), a warning buzzer produces a sound indicative of a failure in the data transmission and/or a warning lamp is lighted to indicate failure (Step 606).

According to the second embodiment, as described above, the failure in the transmission of the data to each bus connected to the lower-order terminal 13c as seen from the present terminal 13b can easily be detected by monitoring the given time interval which has elapsed from the time of the data transmission request.

The initially-set value of the timer 11 of each of the terminals 13 may be changed depending on the number of the lower-order terminals or the processing capacity of each terminal.

Having now fully described the invention, it will be apparent to those skilled in the art that many changes and modifications can be made without departing from the spirit or scope of the invention as set forth herein.

What is claimed is:

1. A system for detecting failures in a user network which transmits and receives information in cell form, said system comprising:

network terminal means;

dual bus means comprising a downbus and an upbus, both connected to said network terminal means, said dual bus means adapted for transmitting a cell comprising a header field and an information field, said header field being indicative of whether a data transmission request message or information has been stored in such cell, said information field being adapted to store data therein; and a plurality of terminals connected to said dual bus means, said terminals comprising data transmission processing means for issuing a data transmission request, downbus processing means for bringing said cell from said downbus for processing the cell in accordance with a desired process and returning said cell to said downbus, a timer, and failure detecting means for activating said timer for counting a given time interval in response to a data transmission request being issued from said data transmission processing means and for detecting a transmission failure when the transmission of the information registered in said information field of said cell is disallowed before said timer expires.

2. A system according to claim 1, wherein the expiration period of said timer is as long as each of terminals other than a terminal located at the position nearest said network terminal means is progressively spaced away from said terminal nearest said network terminal means along said dual bus means.

3. A system according to claim 1, wherein the header field of the cell includes a request bit for entering a request message therein and a busy bit for indicating whether or not data has been stored therein; and whereby said failure detecting means is activated to start said in response to when a cell having a header with a request message entered therein is sent to said downbus after the data transmission request has been issued from said data transmission processing means in each of said terminals and said failure detecting means detects a failure in said dual bus means when a cell traveling along said upbus having a header indicating that no information has been stored in said cell is accessed and the transmission of said accessed cell having an information field with data entered therein to said upbus is disallowed before said timer expires.

4. A system connected to a downbus and an upbus, for transmitting a cell having a header field including a request bit for entering a request message therein, and an information field for storing data therein for detecting failures in a user network, said system comprising:

data transmission processing means for issuing a data transmission request, downbus processing means for bringing said cell from said downbus for processing the cell in accordance with a desired process and returning said cell to said downbus, a timer, and failure detecting means for activating said timer for counting a given time interval in response to a data transmission request being issued from said data transmission processing means and for detecting a failure in said dual bus means when said cell is accessed and the entry of the request message in said request bit of said cell is disallowed before said timer expires.

5. A terminal connected to an upbus and a downbus which transmits and receives in cell form, said cell having a header field including a request bit for entering a request message therein and a busy bit for indicating whether or not data has been stored in the cell, said terminal comprising:

data transmission processing means for issuing a data transmission request via a cell;

downbus processing means for bringing a cell from said downbus in said dual bus means for processing the cell in accordance with a desired process and thereafter delivering the cell to said downbus;

upbus processing means for bringing a cell from said upbus in said dual bus means for processing the cell in accordance with a desired process and thereafter delivering the cell to said upbus;

request counter means for accessing cells traveling along said downbus so as to count the number of request bits;

down counter means for accessing cells traveling along said upbus so as to count down each time said cells having busy bits indicative of vacant states pass through said upbus;

timer means for counting a given time interval each time a cell with either a data transmission request or a request message registered therein is transmitted; and failure detecting means for determining from said timer means whether or not a failure has occurred in the dual bus means.

* * * * *

UNITED STATES PATENT AND TRADEMARK OFFICE
CERTIFICATE OF CORRECTION

PATENT NO. : 5,379,307
DATED : January 3, 1995
INVENTOR(S) : Ryoichi ISHIBASHI et al.

It is certified that error appears in the above-indentified patent and that said Letters Patent is hereby corrected as shown below:

Column 3, line 38, delete "as to".

Column 4, line 37, delete "when";

line 66, delete "a".

Column 6, line 36, after "with" insert

--respect to--;

line 63, change "signalling" to

--signaling--.

UNITED STATES PATENT AND TRADEMARK OFFICE
CERTIFICATE OF CORRECTION

PATENT NO. : 5,379,307
DATED : January 3, 1995
INVENTOR(S) : Ryoichi ISHIBASHI et al.

It is certified that error appears in the above-indentified patent and that said Letters Patent is hereby corrected as shown below:

Column 7, line 7, change "and" to --has been--;

line 8, change "has been" to --and--;

line 30, delete "or not".

Column 8, line 42, change "1= "0"" to

--= "0",--.

Signed and Sealed this

Twenty-ninth Day of August, 1995

Attest:

BRUCE LEHMAN

*Attesting Officer*    *Commissioner of Patents and Trademarks*